United States Patent
Becherucci et al.

(10) Patent No.: US 6,325,199 B1
(45) Date of Patent: Dec. 4, 2001

(54) PALLET CONVEYOR APPARATUS

(75) Inventors: Raffaele Becherucci, Scandicci Florence; Gianfranco Stratico, Siena; Vieri Ancillotti, Empoli, all of (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 09/409,038

(22) Filed: Sep. 29, 1999

Related U.S. Application Data
(60) Provisional application No. 60/103,043, filed on Oct. 5, 1998.

(51) Int. Cl.$^7$ ..................................................... B65G 15/64
(52) U.S. Cl. ..................................... 198/345.3; 198/465.1; 198/465.2
(58) Field of Search ................. 198/867.13, 867.14, 198/345.3, 346.1, 349, 350, 465.1, 465.2, 468.01, 867.1; 29/759, 760

(56) References Cited

U.S. PATENT DOCUMENTS

| | | | |
|---|---|---|---|
| 3,854,889 | 12/1974 | Lemelson | 29/33 |
| 4,042,118 | * 8/1977 | Schmidt | 198/468.1 |
| 4,193,312 | * 3/1980 | Cicognani | 198/648 |
| 4,237,598 | 12/1980 | Williamson | 29/568 |
| 4,460,966 | 7/1984 | Chynoweth et al. | 364/468 |
| 4,473,883 | 9/1984 | Yoshida et al. | 364/474 |
| 4,712,670 | 12/1987 | Burkhardt . | |
| 4,713,883 | 12/1987 | Santandrea et al. | 29/736 |
| 4,768,727 | 9/1988 | Sandandrea et al. | 242/7.05 |
| 4,815,673 | 3/1989 | Wheeler et al. | 242/7.09 |
| 4,892,186 | * 1/1990 | Frei | 198/803.1 |
| 4,981,207 | * 1/1991 | Kuikka | 198/860.3 |
| 5,441,146 | * 8/1995 | Ziegler | 198/465.1 |
| 5,503,264 | * 4/1996 | Eberle | 198/803.01 |
| 5,518,105 | * 5/1996 | Richard et al. | 198/465.1 |
| 5,715,585 | * 2/1998 | Zachau et al. | 198/345.3 |
| 6,112,886 | * 9/2000 | Horn | 198/867.13 |

FOREIGN PATENT DOCUMENTS

| | | |
|---|---|---|
| 682 069 A | 7/1993 | (CH) . |
| 94 16 155 U | 8/1995 | (DE) . |
| 1 261 264 A | 1/1972 | (GB) . |

* cited by examiner

Primary Examiner—Douglas Hess
(74) Attorney, Agent, or Firm—Fish & Neave; Robert R. Jackson

(57) ABSTRACT

A pallet conveyor apparatus for moving pallets, which carry components of a dynamo-electric machine, along and between routes of a manufacturing line is provided. The pallet conveyor apparatus includes a plurality of pallets, at least one substantially horizontal rail structure, at least one loop-shaped conveyor belt, and a drive for causing the conveyor belt to move along an upper track of the rail structure. The conveyor apparatus may be driven with a drive cartridge that fits within the rail structure. A pallet for use with the apparatus has a platform and a seat portion. The platform has an upper surface that supports the component. The seat portion has a substantially inverted "U" shape. The seat portion of the rail structure has a central surface and two opposing surfaces. The dimensions of the seat portion and the rail structure are such that when the seat portion fits over the rail structure a pallet will be prevented from falling off the rail structure.

23 Claims, 9 Drawing Sheets

PALLET CONVEYOR APPARATUS

CROSS REFERENCE TO RELATED APPLICATION

This application claims the benefit of U.S. Provisional Application No. 60/103,043, filed Oct. 5, 1998.

BACKGROUND OF THE INVENTION

The present invention relates to improved solutions for conveying electric machine components (e.g., armatures or stators for electric motors, generators, or alternators) between different processing stations and between machines of the same processing station of a manufacturing line.

Manufacturing lines that use pallet conveyor apparatus are known. For example, the disposition of processing stations along such lines, the sequence with which the pallets reach the stations, and the transport routes by which the pallets reach the stations have been described in Santandrea et al. U.S. Pat. No. 4,984,353, which is hereby incorporated by reference herein.

A component of a dynamo-electric machine (e.g., the armature or stator being made) is often carried along the manufacturing line by a conveyor apparatus while mounted on a pallet, which may carry one or more such components. The pallet can be encoded in a known way with information regarding the condition of the component or components it is carrying. The encoded information can include an identification of the processing steps to be performed, the status of each step, whether the component should be rejected, etc. The information can be encoded magnetically, electronically, mechanically, or electromechanically, and a suitable reading device is provided adjacent each processing station to read the information. When a manufacturing line or processing station includes a plurality of routes, pallets are usually transferred between the routes as necessary. Pallet transfer should be simple and reliable, but should not interfere with the information encoded on the pallet. Moreover, a pallet should be able to convey different size components along the manufacturing line.

Some manufacturing lines include processing stations with two or more machines that perform the same function (e.g., winding). Two or more machines may be needed at a single processing station to avoid a "bottleneck" when the processing time of a machine is longer than the processing time required by other machines or stations of the same manufacturing line. Transfer between machines of a single station, however, can be mechanically complicated and expensive to manufacture and maintain. Moreover, conventional transfer apparatus can consume substantial floor space, making it difficult for an operator to gain access to components and machines of a processing station.

It is therefore desirable to provide a mechanically reliable conveyor apparatus that provides an operator easy access to components and machines of a processing station.

In view of the foregoing, it is an object of this invention to provide a solution for the problems associated with conveying and transferring dynamoelectric machine components in a manufacturing line.

It is another object of this invention to provide a reliable pallet conveyor apparatus that accommodates a large number of pallets, each of which can accept multiple size components.

It is yet another object of this invention to provide a pallet conveyor apparatus that provides an operator easy access to components and machines of a processing station along a manufacturing line.

It is still another object of this invention to provide a pallet conveyor apparatus that can transfer pallets between different manufacturing lines, including compact, vertically stacked manufacturing lines, without complicated transfer apparatus.

SUMMARY OF THE INVENTION

These and other objects of the invention are accomplished in accordance with the principles of the invention by providing a pallet conveyor apparatus that includes a plurality of pallets, at least one substantially horizontal rail structure, at least one loop-shaped conveyor belt, and a drive for causing the conveyor belt to move on an upper track of the rail structure along the rail structure's length.

Each of the pallets includes a platform having an upper surface adapted to at least partially support a component, and a seat portion having a substantially inverted "U" shape. The seat portion of the rail structure has a central surface and two opposing surfaces. The opposing surfaces have a first height and are separated by a first distance.

The rail structure has a length, an upper track, and two side surfaces. The side surfaces have a second height and are separated by a second distance. The first distance is larger than the second distance so that the rail structure can fit between a pallet's opposing surfaces. Also, the first and second heights are sufficient to prevent pallets from falling off the rail structure.

The conveyor belt has an inner belt surface and an outer belt surface. The inner belt surface is at least partially disposed on the upper track of the rail structure and the outer belt surface at least partially engages a central surface of a pallet. The drive, which may be an electric motor, for example, causes the conveyor belt to move along the upper track of the rail structure, thereby causing pallets resting on the conveyor belt to be moved.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 1 is taken along the line 1—1 in FIG. 2.

FIG. 3 is taken along line 3—3 of FIG. 2.

DETAILED DESCRIPTION OF THE PREFERRED EMBODIMENTS

The present disclosure concerns improved solutions for transporting armature or stator assemblies by means of pallets, between processing stations of manufacturing lines.

Figure 1:
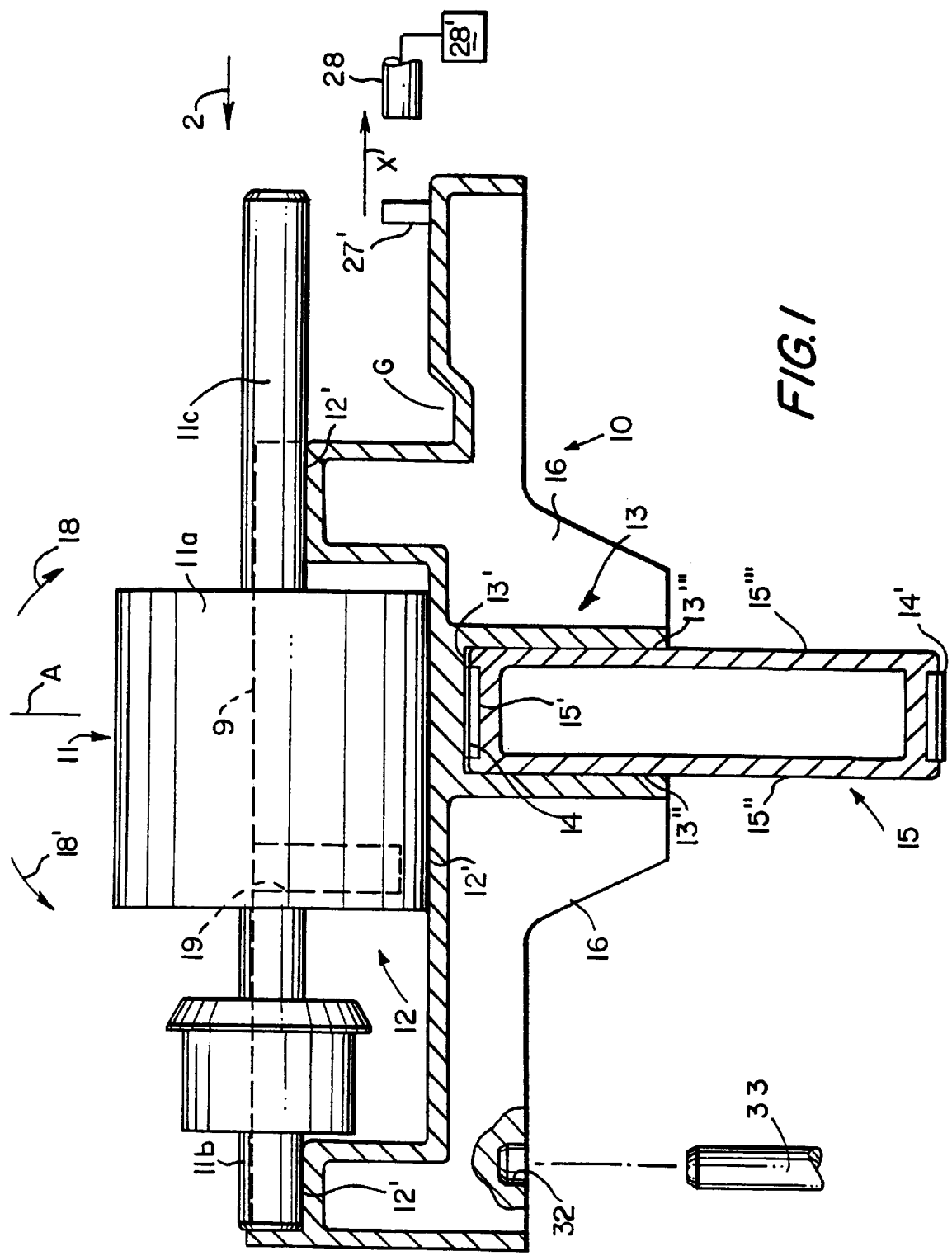
FIG. 1 is an elevational sectional view of an illustrative pallet constructed in accordance with the principles of this invention. The pallet is mounted on a rail structure and is supporting an armature.

FIG. 1 shows pallet 10 supporting various portions of armature 11 (i.e., lamination stack 11a, and shafts 11b and 11c) on supporting surfaces 12' of seat portion 12. Supporting surfaces 12' extend sufficiently in direction X to be able to support different armatures.

Figure 4:
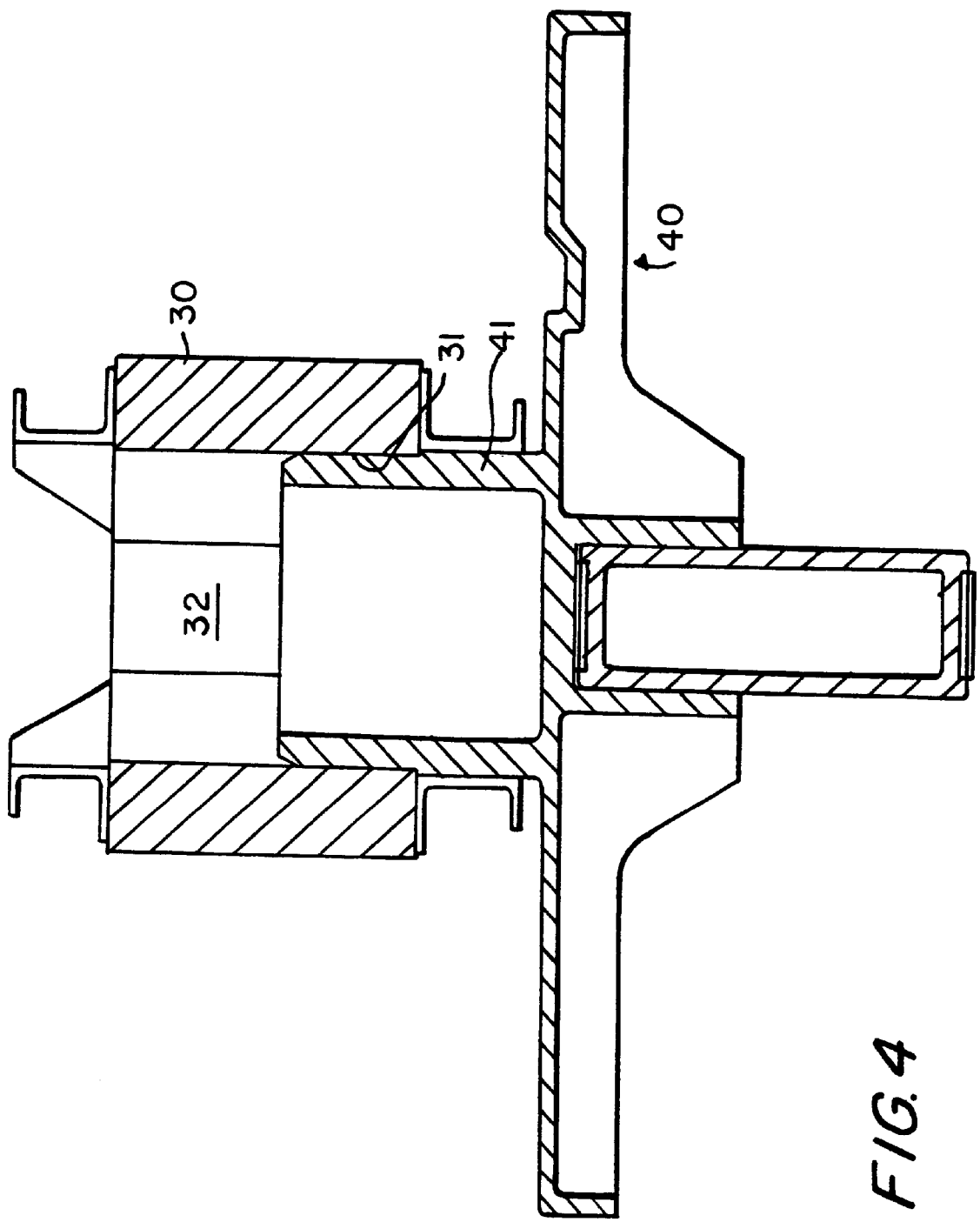
FIG. 4 is an elevational sectional view of another illustrative pallet constructed in accordance with the principles of this invention. The pallet is mounted on a rail structure and is supporting a stator.

The underside of pallet 10 is adapted to receive at least part of a rail structure (see below). In FIGS. 1 and 4, for example, the undersides of pallets 10 and 40 are adapted to receive a single rail structure on which a single belt moves. Alternatively, the underside of the pallets can be shaped to receive and engage two or more rails, on which conveyor belts synchronously convey the pallet (not shown). Regardless of the number of rails used, a pallet according to this invention will have an underside shaped to accommodate the one or more rails to ensure accurate translation along the rail without significant lateral motion.

In particular, the underside of pallet 10 is provided with seat 13 having an inverted "U" shape, which is formed by portions 13', 13", and 13'". Central portion 13' rests on conveyor belt 14, while portions 13" and 13'" act as surfaces that abut respectively against sides 15" and 15'" of rail structure 15. Upper face 15' of rail structure 15 has a track that supports conveyor belt 14. Narrow gaps are normally present between sides 13" and 15", and sides 13'" and 15'". If pallet 10 tends to topple off structure 15 (by rotation in directions 18 or 18') due to the overhead mass placement of armature 11, portions 13" and 13'" will move to close the gaps by engaging respectively sides 15" and 15'", thereby sustaining the pallet.

Figure 2:
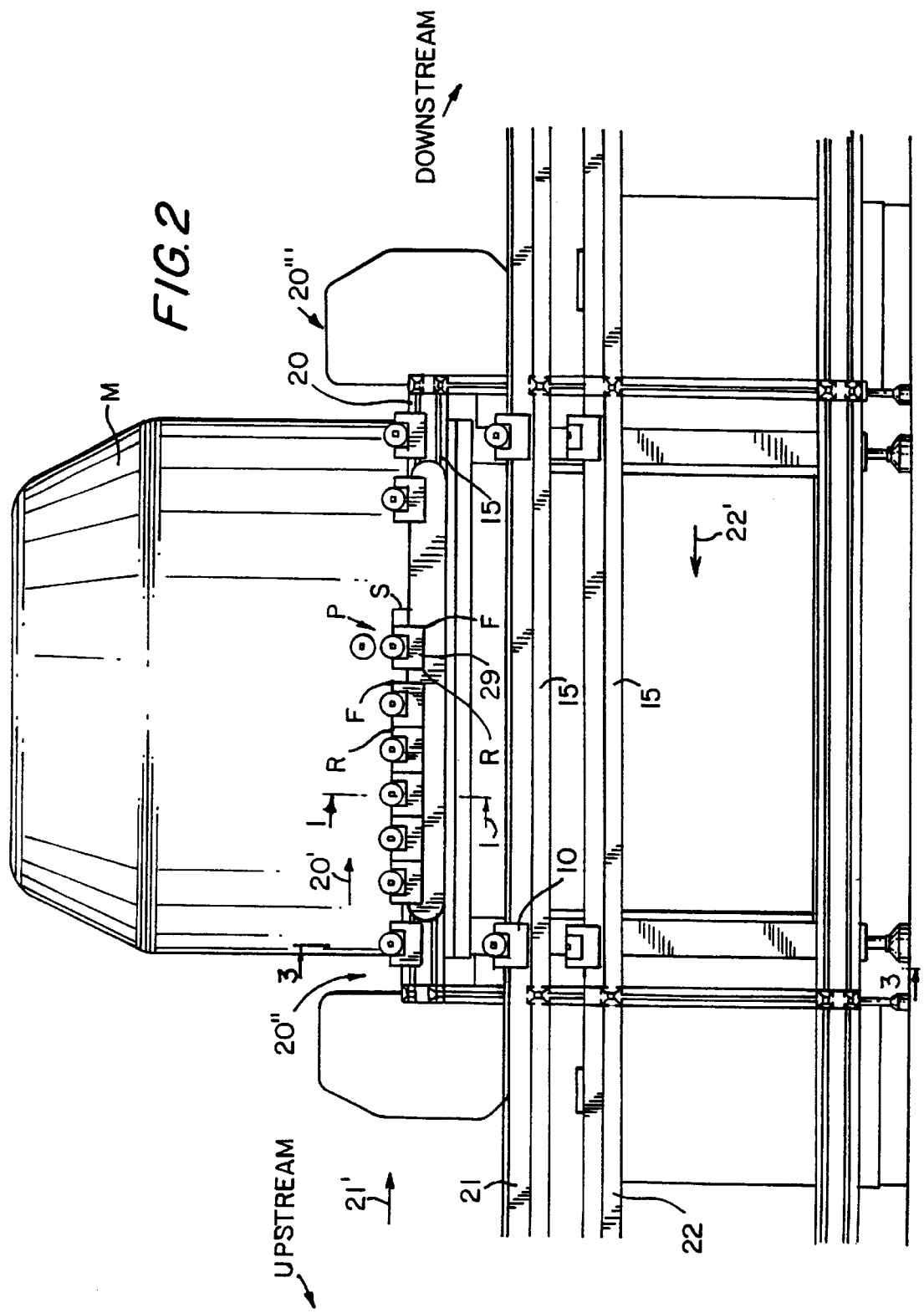
FIG. 2 is a front elevational view of a portion of a manufacturing line, constructed in accordance with the principles of this invention.

FIG. 2 shows a processing station of a manufacturing line with more than one machine of the same type (for example, two or more winders). Such a station can perform identical manufacturing operations at the same time on a plurality of components. The machines of such a station usually process components singularly. The station shown in FIG. 2 may be needed when the machines of the station require processing times that are longer than other machines of other stations of the line.

FIG. 2 shows three different pallet routes 20, 21, and 22 in front of machine M of a processing station.

Route 20 moves pallets in direction 20' and includes rail structure 15 and conveyor belt 14 on which the pallets rest. The motion aligns the pallets at the machines where they need to be processed. Point P represents the position on route 20 where the armatures supported by the pallets can be loaded and unloaded. Successive pallets can form a queue behind the pallet at point P. Other machines of the same station (not shown) can also have similar pallet routes for loading and unloading armatures that need processing.

Route 21 moves pallets in direction 21'. Like route 20, route 21 includes rail structure 15 and conveyor belt 14 on which pallets rest. As indicated in FIG. 2, route 21 transports pallets into the station from an upstream portion of the manufacturing line and transports pallets away from the station to a downstream portion of the manufacturing line after being processed. If desired, route 21 can pass in front of all the machines of the station.

A pallet moving in direction 21' along route 21 can deliver a work piece (e.g., an armature) to a machine, such as machine M of FIG. 2. Machines of a processing station can be positioned in a sequence along route 21. When a pallet is removed from route 21 at position 20", for example, it can be placed in a queue in front of a machine that is capable of receiving it. Preferably, the first machine of the sequence that has room at the end of its respective queue will receive the pallet.

Once a pallet is placed on route 20, it moves in direction 20' until it reaches position P. At position P, the component is unloaded from the pallet, processed, and reloaded. After being reloaded, the pallet moves to position 20'" at the end of route 20 where it can be returned to route 21. Then, the loaded pallet can move in direction 21' to reach the downstream portion of the line.

Route 22 passes through the station and moves pallets in direction 22'. Route 22 performs two functions. First, route 22 returns empty pallets from the downstream portion of the line to the beginning of the upstream portion of line. Second, route 22 returns pallets with unprocessed components to route 21.

The components that are returned to route 21 from route 22 may be unprocessed because all of the machines along the manufacturing line were unavailable to receive the work pieces when they passed by the machines, loading points, such as point 20'. This can occur when the queues formed in front of each machine are unable to accept additional pallets. This can also occur when the machines are under repair or being maintained. In any case, such pallets are returned to route 21 so that they can again try to find a free place in a queue of an operating machine. Routes like these are described, for example, in U.S. Pat. No. 4,984,353 for a winding station.

As already explained somewhat above, conveyor belt 14 moves pallet 11 of FIG. 1 along the length of rail structure 15. When there is sufficient frictional contact between outer surface of conveyor belt 14 and surface 13' of seat portion 13, pallet 10 will be conveyed synchronously with conveyor belt 14. Conveyor belt 14 can be looped around structure 15. Inner surface of conveyor belt 14 guides along upper surface 15' of structure 15 (e.g., in a track) and can return along the underside of structure 15. Conveyor belt 14 can be driven by any suitable drive, such as an electric motor, which can be located, for example, in or adjacent to structure 15. For a more complete description of the how an electric motor can be used to drive conveyor belt 14 according to this invention, see FIGS. 7–9, which are described below.

Pallet 10 has ribs 16 that extend downward in order to reinforce portions 13" and 13'" of the "U" shaped seat portion. Pallet 10 may also have side walls 9 with apertures 19 that are opposite each other for providing access to opposing jaws of a transfer gripping unit that may be located at a position along a route, such as at position P of FIG. 2. Jaws of the transfer gripping unit can thus move through apertures 19 to grasp armature 11 to remove it from pallet 10, or to release armature 11 when armature 11 is loaded onto pallet 10. Such transfer gripping units are described in Andorlini et al. U.S. Pat. No. 5,253,912, which is hereby incorporated by reference herein.

While the pallets are moving along a route, they can be stopped at any predetermined position by providing a mechanical stop with a stop surface. For example, FIG. 2 shows mechanical stop S. The stop surface of mechanical stop S is positioned to engage the forward face F of pallet 29, stopping pallet 29, while the conveyor belt continues to move.

Pallets can queue up behind first pallet 29. Once this pallet is stopped, the next pallet in the queue will stop behind the first pallet by engaging forward face F with rear face R of pallet 29. Preferably, the lower portions of the front and rear faces will abut. Additional successive pallets can also be stopped in the queue by engaging their forward faces with the rear faces of adjacent pallets that have already been stopped. The conveyor belt continues to move as the additional pallets engage each other.

Because the combination of seat 13 and rail structure 15 provides a high degree of pallet stability, the pallets, as viewed from line 2—2 of FIG. 1, can be narrower than conventional pallets. This narrow construction makes it possible to form a queue with a large number of pallets along the length of the rail structure in front of a machine.

The forward and rear faces of each pallet extend in an upward direction to provide a sufficient surface for engagement between adjacent pallets in a queue. The forward and rear faces prevent the pallets from climbing over each other during engagement while the conveyor belt moves below them.

Figure 3:
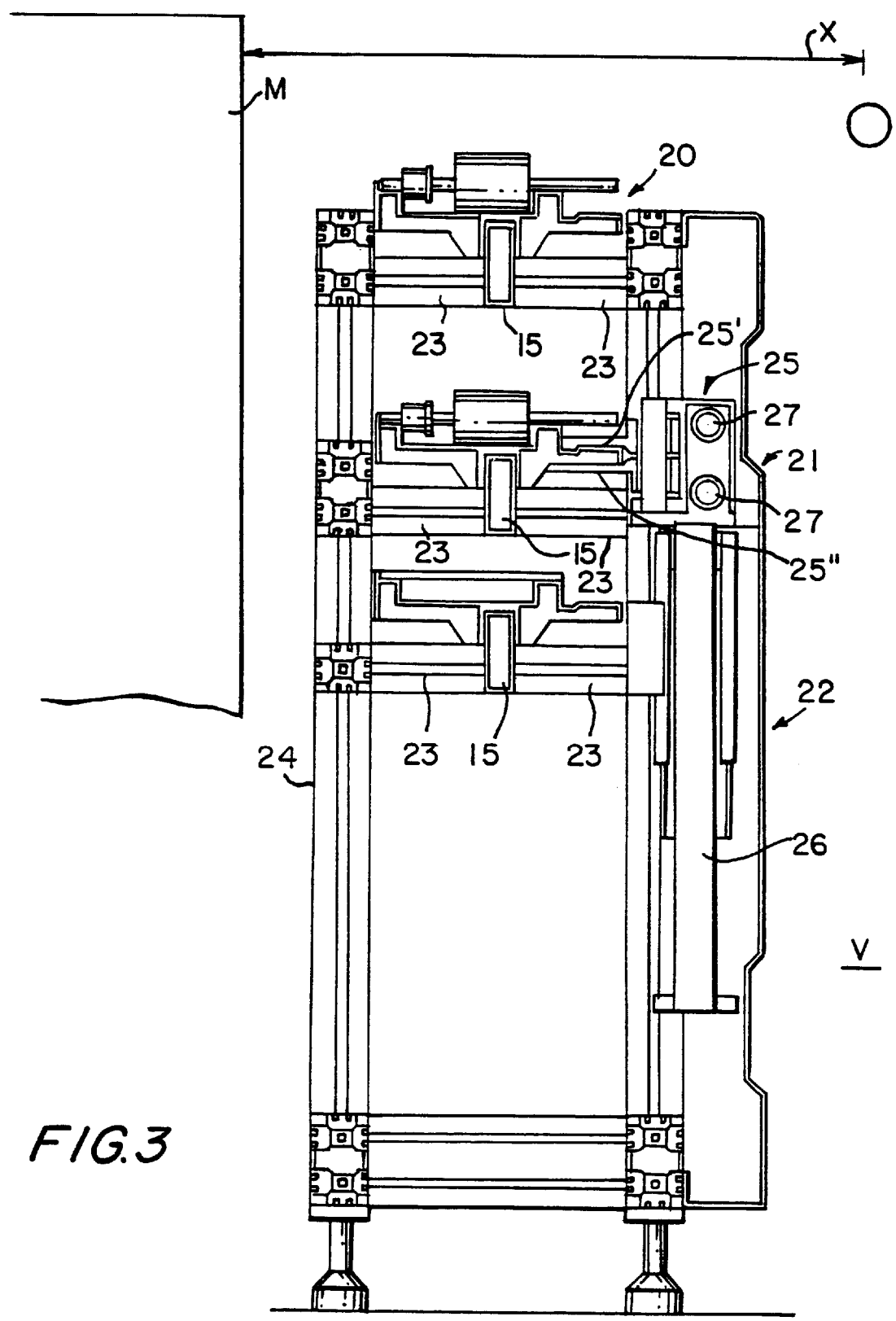
FIG. 3 is a side elevational view of the same portion of the manufacturing line shown in FIG. 2.

FIG. 3 shows a side view of the manufacturing line shown in FIG. 2. In particular, FIG. 3 shows how routes 20, 21, and 22 can be arranged in vertical plane V in front of machine M. This arrangement is possible because the rail structure of each route can be vertically connected with support brackets 23 to vertical frame 24. When routes 20, 21, and 22 are arranged vertically, as shown in FIGS. 2 and 3, distance X between operator O and machine M is much less than the comparable distance when those routes are disposed horizontally, as shown, for example, in U.S. Pat. No. 4,984,353. Thus, the operator observing machine M has a clearer view of the operations occurring in machine M, and easier access to the armatures being processed on route 20 and transported on routes 21 and 22.

FIG. 3 also shows one way that pallets can be transferred between different positions on the routes. Gripping unit 25 has gripping jaws 25' and 25" located at position 20" where pallets can be transferred from one route to another. Gripping jaws 25' and 25" can move toward each other in vertical plane V and grip a pallet in position G. This is shown in FIG. 3 for a pallet located on route 21. While gripping the pallet, jaws 25' and 25" can be upwardly moved along guide bars 26 until seat 13 is aligned with an end of rail structure 15.

After alignment, the jaws can move on guides 27 toward structure 15 to insert seat 13 onto rail structure 15, as shown in FIG. 1. In the case of FIGS. 1 and 3, this movement is into the page. In FIG. 2, the movement is in direction 201. Once seat 13 is inserted onto rail structure 15, the jaws can move away from each other to release the pallet.

Thus, a method of transferring pallets between substantially horizontal rail structures that are positioned in a substantially vertical plane is provided. In a first step, a pallet is conveyed along a first rail structure. In a second step, the pallet is stopped at a point on the first rail structure with a physical stop. In a third step, the pallet is engaged with transfer equipment (e.g., a gripping unit or lift). It will be appreciated that when a gripping unit is used, a portion of the pallet can stop between the jaws of the gripping unit in the second step to prepare for engagement with the pallet in the third step. Next, the pallet is transferred with the transfer equipment from the first rail structure to a second rail structure. Finally, the pallet is released to allow for further processing.

Pallet 10, or any other pallet constructed in accordance with this invention, can carry pin 27' for encoding information. As shown in FIG. 1, pallet 10 is oriented so that pin 27' is located on the right side of rail structure 15 and can be read by pin reader 28 when pallet 10 is at a particular point along the manufacturing line. Seat portion 13 can be designed so that pallet 10 can be raised above structure 15, rotated by 180° around vertical axis A, and lowered back onto structure 15. After pallet rotation (not shown), pin 27' will be on the opposite side of rail structure 15 (i.e., left side of FIG. 1) with respect to reader 28 so that reader 28 will no longer be able to read (e.g., detect) the pin. If pin reader 28 can not read pin 27', control unit 28' (i.e., a computer) can determine that pallet 10 has a predetermined condition of armature processing. Based on this condition, an action can be subsequently taken. For example, when the condition of the armature is determined to be unsatisfactory (e.g., after detecting, or not detecting, pin 27'), an action can be determining that an armature should not undergo further processing.

FIG. 4 shows another illustrative pallet 40 that can be constructed in accordance with this invention. Pallet 40 supports stator 30 by engaging interior surface 31 of central bore 32 of stator 30 on central column 41 which extends upwardly from pallet 40. The principles of moving and transferring stators between machines and stations of a manufacturing line already described in accordance with this invention are applicable to the pallet of FIG. 4. Because the pallets shown in FIGS. 1 and 4 can be placed on a rail structure in two different orientations, a pallet according to this invention is preferably structurally symmetric (i.e., symmetric about the vertical plane containing the rail structure) to eliminate misorientation of the pallet during placement on the rail structure.

Figure 5:
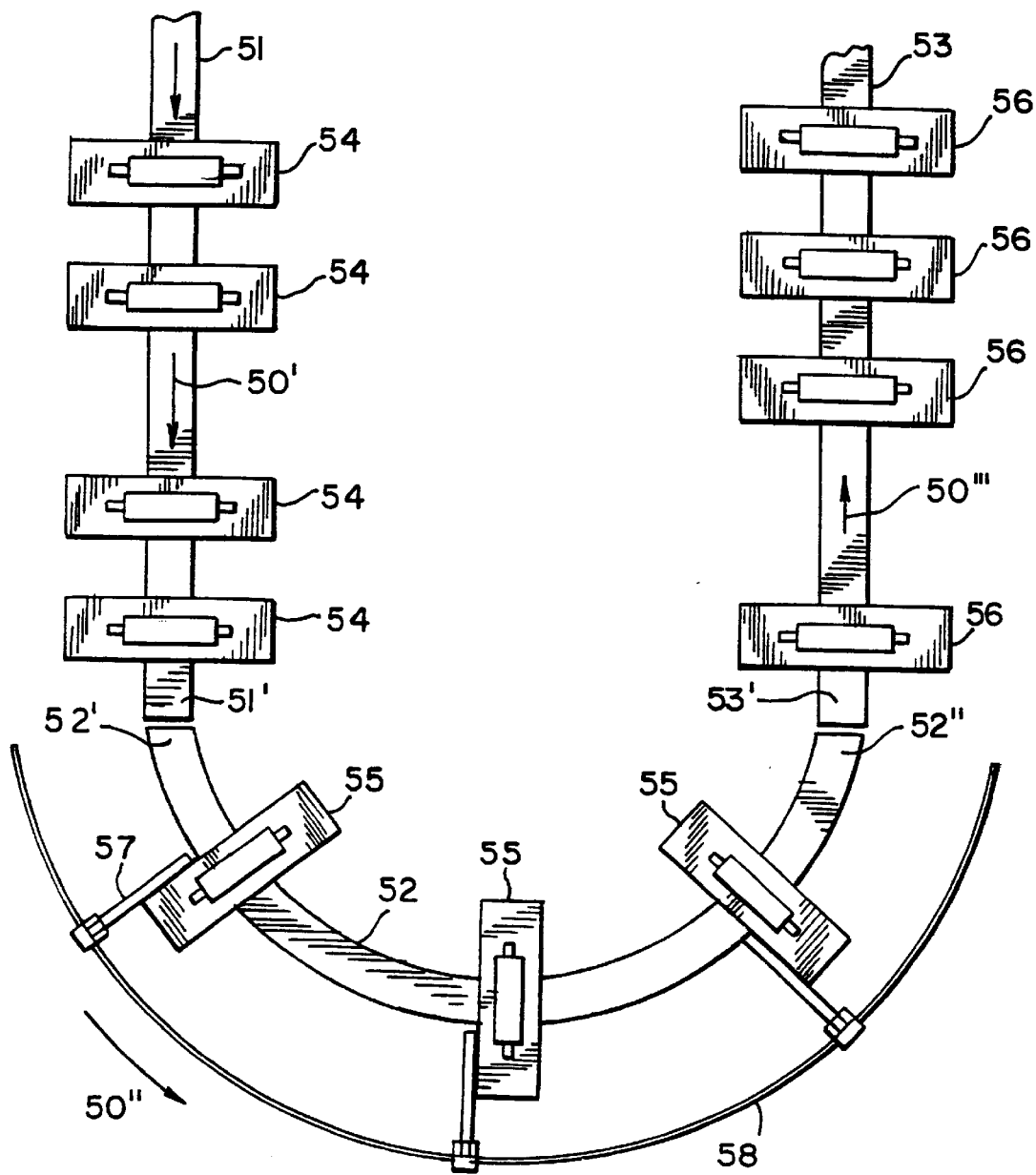
FIG. 5 is a plan view of an illustrative pallet conveyor apparatus in accordance with the principles of this invention.
Figure 6:
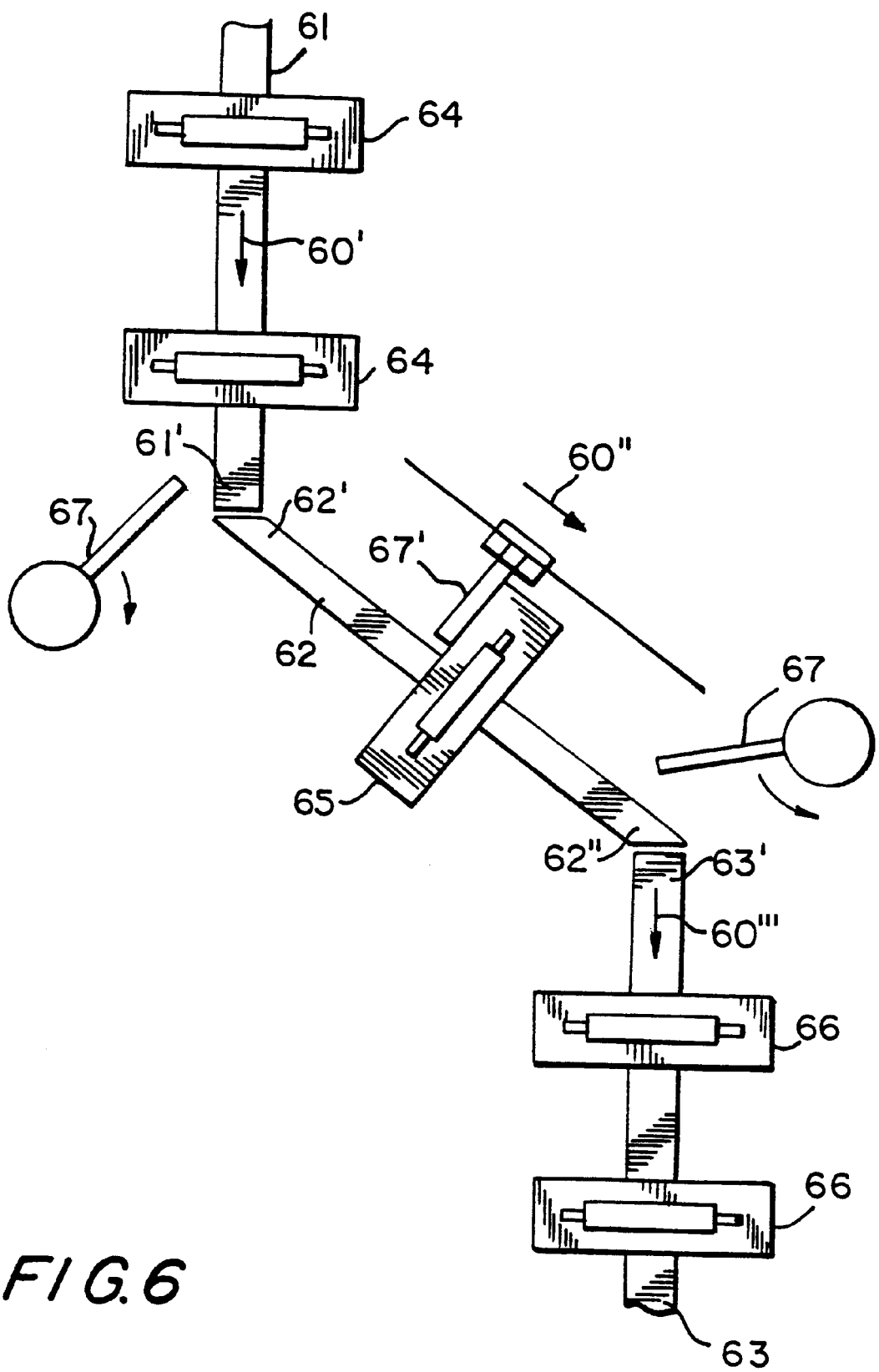
FIG. 6 is a plan view of another illustrative pallet conveyor apparatus in accordance with the principles of this invention.

FIGS. 5 and 6 show how pallets can be transferred between routes (particularly between routes substantially in a horizontal plane) using an intermediate route that does not include a conveyor belt.

FIG. 5 shows pallets 54 moving on route 51 in direction 50', pallets 55 moving on arcuate route 52 in direction 50", and pallets 56 moving on route 53 in direction 50'". Pallets 54 and 56 move along their respective routes by conveyor belts as already described, but pallets 55 move along route 52 by pallet pushers 57. As shown in FIG. 5, ends 52' and 52" of route 52 are alignable with respective ends 51' and 53' of routes 51 and 53. Pallet pushers 57 can be driven along track 58 in any conventional way. It will be appreciated that although pallets 54, 55, and 56 (shown on respective routes 51, 52, and 53) do not engage each other to form queues, such engagement is possible. If a queue is formed on route 52, a single rotating pallet pusher (not shown) could be placed at the upstream end of route 52 to move pallets 55 along route 52.

FIG. 6 shows pallets 64 moving on route 61 in direction 60', pallet 65 moving on linear route 62 in direction 60", and pallets 66 moving on route 63 in direction 60'". Pallets 64 and 66 can be moved along their respective routes by conveyor belts. Pallet 65 can be moved along route 62 by rotary pallet pushers 67 and/or linear pallet pushers 67'. As shown in FIG. 6, ends 62' and 62'" of route 62 are alignable with respective ends 61' and 63' of routes 61 and 63. Rotary pallet pushers 67 sweep pallets from route 61 to route 62 and from route 62 to route 63. Linear pallet pushers 67' push pallets 65 along on route 62. It will be appreciated that although the pallets 64, 65, and 66 do not engage each other on routes 61, 62, and 63, such engagement is possible. In such a case, a single rotating pallet pusher at the upstream end of route 62 could be sufficient to move a queue of engaging pallets.

Thus, it can be seen that pallets can be pushed on and off rail structures with one or more pallet pushers.

In addition to pallet pushers, and as shown in FIG. 1, a pallet can be transferred between different routes or different positions of the same route with lifting rods 33 when the pallet has bores 32 adapted to receive such rods. Lifting rods 33 can also be used to lift a pallet off of a rail structure to an overhead position required by a machine to process the component on the pallet. It will be appreciated that although the pallet shown in FIG. 1 only includes single bore 32 for receiving single lifting rod 33, a pallet can have two or more bores for synchronously receiving two or more lifting rods. Although mechanically more complicated, multiple synchronized lifting rods would increase stability by minimizing the cantilever effect normally present with asymmetric approaches.

Figure 7:
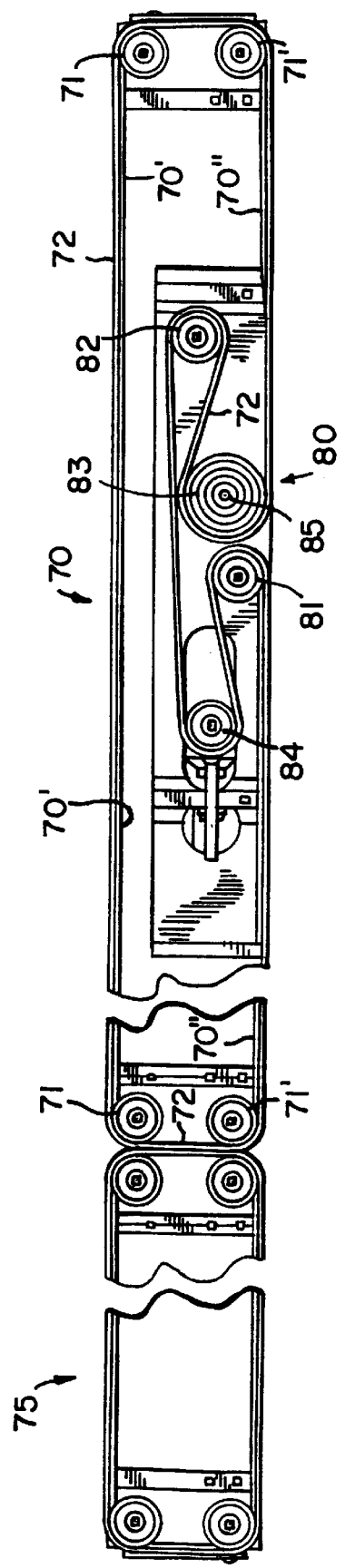
FIG. 7 is a side elevational view, partly in cross-section, of two abutted illustrative rail sections, such as the ones shown in FIGS. 1–4, in accordance with the principles of this invention.

FIG. 7 shows a side elevational view, partly in section, of rail structures 70 and 75. Rail structure 70 includes upper rotatable guiding wheels 71 at both upper corners of structure 70 for guiding belt 72 along the upper surface 70' of structure 70, and lower rotatable guiding wheels 71' at both lower corners of structure 70 for guiding belt 72 along lower surface 70" of structure 70. Lower guiding wheels 71' also guide belt 72 to drive cartridge 80, which is positioned within rail structure 70. Although rail structure 75 also includes a drive cartridge, the cartridge is not shown to simplify FIG. 7.

Figure 8:
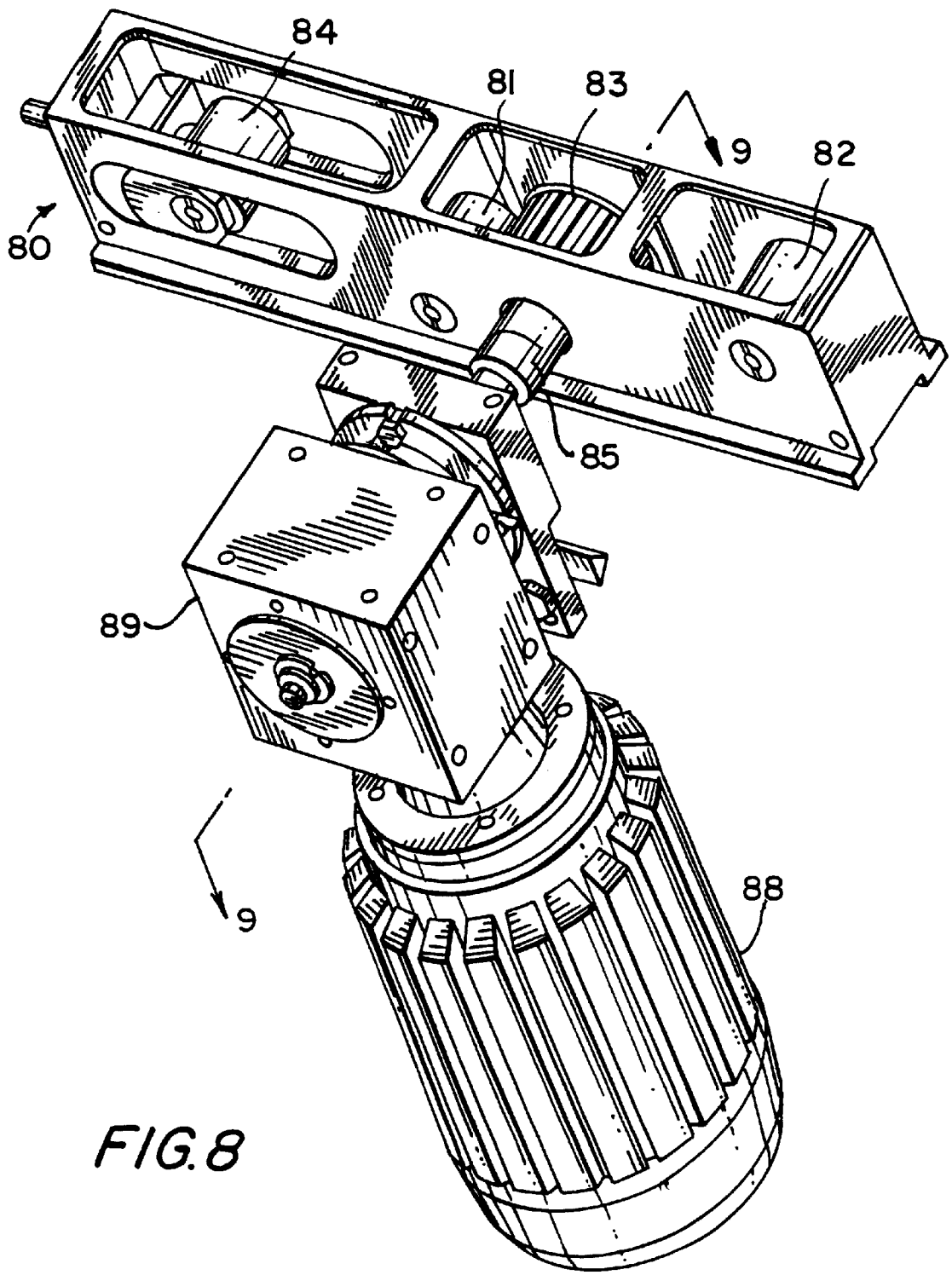
FIG. 8 is a perspective view of the illustrative drive cartridge shown in FIG. 7, along with an electric motor and gear box, which can be positioned in a rail section for driving a conveyor belt as shown in FIG. 7, in accordance with the principles of this invention.

FIG. 8 shows drive cartridge 80, which includes two fixed position wheels 81 and 82, as well as motor wheel 83 and tension wheel 84, for providing a compact folded belt path. It will be appreciated that motor wheel 83 is located near the bottom of cartridge 80, which is itself placed near the bottom of rail structure 70. In this way, drive shaft 85 does not interfere with the lower portions of the inverted "U" structures of pallets (not shown) conveyed along the top of rail structure 70. Drive shaft 85 is powered by motor 88 via gear box 89. Although use of gear box 89 allows for motor 88 to be oriented in any convenient way, FIG. 8 shows motor 88 oriented in a substantially vertical plane to minimize the horizontal distance X between operator O and machine M (see FIG. 3).

Figure 9:
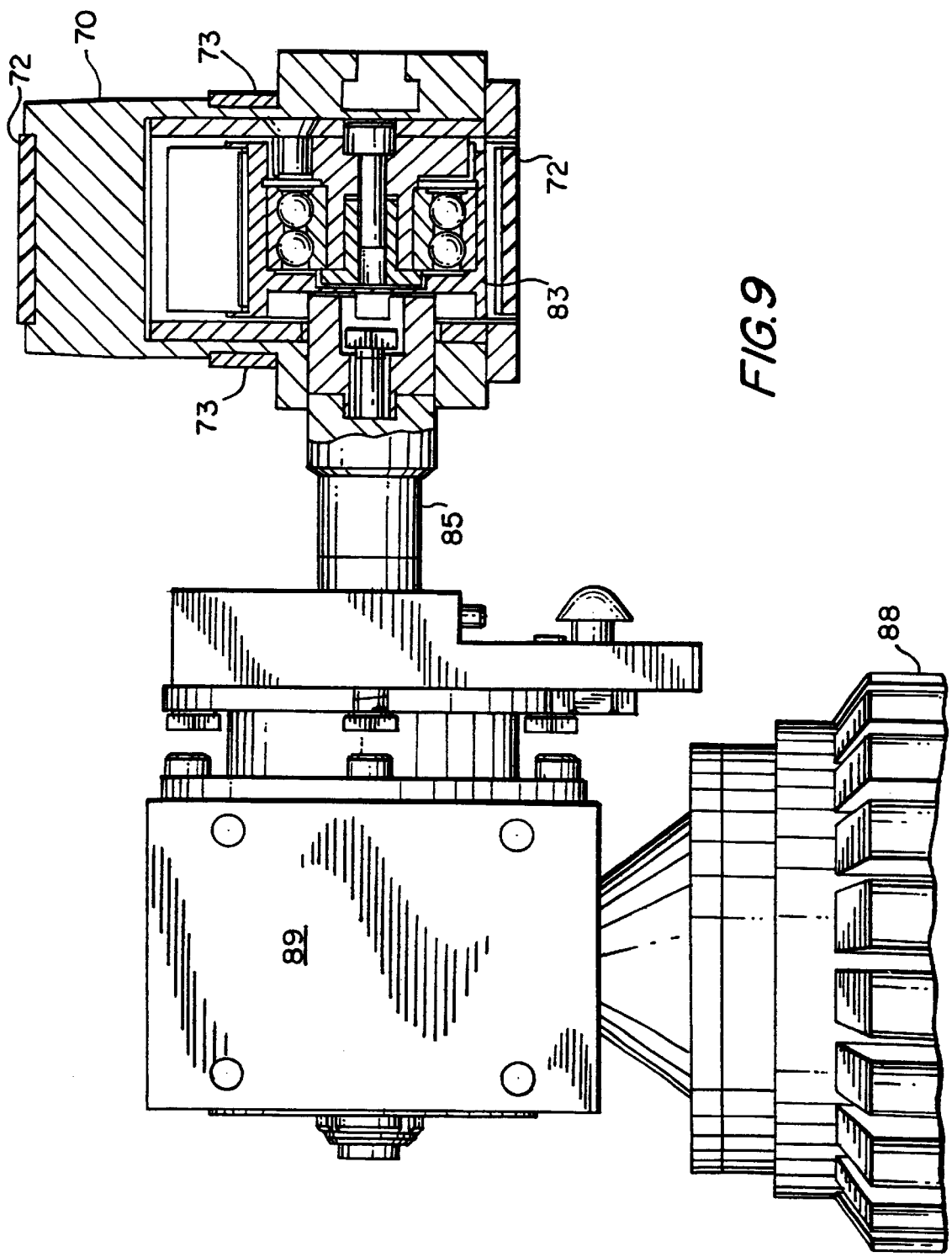
FIG. 9 is an elevational view, in cross-section, of the illustrative drive cartridge shown in FIG. 8, taken from line 9—9 of FIG. 8, along with the electric motor and gear box, in accordance with the principles of this invention.

FIG. 9 shows an elevational view, in cross-section, of the illustrative drive cartridge shown in FIG. 8. As best seen in FIG. 9, gibs 73 can be provided as means for overcoming looseness of a pallet during loading and/or unloading of a component at a station. In operation, gibs 73 provides a fixed surface against which a pallet can be precisely positioned during component loading and/or unloading. For example, as shown in FIG. 2, point P represents the position on route 20 where a component supported by a pallet can be loaded and unloaded. Because narrow gaps are normally present between sides 13" and 15", and sides 13''' and 15'''(see FIG. 1), the lateral position of a pallet at point P is not precisely known, which makes automatic loading and unloading more difficult. Accordingly, one of the narrow gaps can be closed by pressing the pallet against one of gibs 73. Because the precise position of the gib would be known, the exact position of the pallet, and therefore the component being carried, would also be known. A pallet at point P can be pressed against one of gibs 73 with any type of actuating device, such as a lateral pusher (not shown).

The modular nature of the rail structures according to this invention allows for rapid configuration and reconfiguration of manufacturing lines. For example, as shown in FIG. 7, two or more rail structures, each with its own drive cartridge, can be placed end-to-end to allow the transfer of pallets therebetween—without the need for a transfer station. This is possible because each rail structure has complementary end shapes to minimize the gap between them. As shown in FIG. 7, rail structures 70 and 75 have substantially vertical ends. In this way, the gap between the two structures can be minimized so that a pallet can be easily and directly delivered from one rail structure to another—without any additional transfer equipment. The modular nature of these rail structures also facilitates vertical stacking, as shown in FIGS. 2 and 3. In any case, whether placed end-to-end or stacked vertically, rail structures with internal drive cartridges according to this invention provide a flexible solution to the problem of complex manufacturing lines.

By using the modular rail structures of this invention as shown, a simplified approach to designing manufacturing lines that require transfer between rail structures is provided. For example, in a manufacturing line it may become necessary to transfer pallets from one rail to another. In one conventional approach, pallets are transferred between different rail lines by repositioning intermediate sections of rail. In another case, the rails themselves remain stationary, but include branches and transfer stations to select the particular branch the pallets should follow. Both methods, however, are undesirable because movement of primary rail structures and the addition of transitional rail sections are required; both solutions tend to be complicated, expensive, and prone to mechanical failure.

In contrast to these conventional methods, and according to another aspect of this invention, pallet transfer between primary rail structures is achieved (e.g., with lifting rods, gripping units, etc.) without affecting the rail structure. Thus, a transfer station according to this invention can transfer pallets between substantially vertically oriented rail structures without the use of an intermediate rail structure.

For example, FIG. 2 shows a front elevational view of a portion of a manufacturing line, including three vertically positioned routes 20, 21, and 22. Middle route 21 is the main route and transports pallets to and from the station in downstream direction 21'. Route 22, which moves in direction 22', moves pallets that are empty to the beginning of the upstream portion of the line and pallets with unprocessed components to route 21. Finally, top route 20 moves pallets in downstream direction 20l and aligns the pallets at the machine where they need to be processed. In accordance with this invention, transfer of pallets between routes 20, 21, and 22 can be effectuated without an intermediate rail structure using, for example, the transfer equipment shown in FIG. 3. With this equipment, a pallet can be transferred between any two routes by lifting the pallet to a position above a first rail structure, moving the pallet to a position above the second rail structure, and then placing the pallet onto the second rail structure. Accordingly, routes 21 and 22 can be made continuous without structural interruptions.

One skilled in the art will appreciate that the present invention can be practiced by other than the described embodiments, which are presented for purposes of illustration and not of limitation, and the present invention is limited only by the claims which follow.

What is claimed is:

1. A pallet and pallet conveyor apparatus comprising:
a plurality of pallets, each of said pallets comprising:
   a platform having an upper surface adapted to at least partially support an electric machine component, and
   a seat portion having a substantially inverted "U" shape, said seat portion having a central surface and two opposing surfaces, said opposing surfaces having a first height and being separated by a first distance;
the conveyor apparatus comprising:
   at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to substantially prevent relative movement along direction x between a pallet and said rail structure;
   at least one loop-shaped conveyor belt having an inner belt surface and an outer belt surface, said inner belt surface being at least partially disposed on said upper track of said rail structure and said outer belt surface being at least partially engaged by a pallet central surface; and
   a drive for causing said conveyor belt to move on said upper track along said length.

2. The pallet conveyor apparatus of claim 1 wherein each of said pallets can fit on said rail structure when said pallet is in at least a first orientation and a second orientation, said second orientation being 180° rotated from said first orientation, and wherein each of said pallets further comprises a pin, said apparatus further comprising:
   a pin reader capable of detecting said pin when said pallet reaches a known point along said at least one rail structure and providing an output that is indicative of whether said pin has been detected at said point; and
   a control unit for determining pallet orientation based on said output.

3. The pallet conveyor apparatus of claim 1 further comprising:
   at least one mechanical stop having a surface for stopping said pallets along said length of said rail structure at a predetermined position.

4. The pallet conveyor apparatus of claim 1 wherein said at least one substantially horizontal rail structure comprises a plurality of substantially horizontal rail structures that are substantially aligned in a vertical plane.

5. The pallet conveyor apparatus of claim 1 wherein said at least one substantially horizontal rail structure comprises a plurality of substantially horizontal rail structures that are substantially aligned in a horizontal plane.

6. A pallet and pallet conveyor apparatus comprising:
a plurality of pallets, each of said pallets comprising:
   a platform having an upper surface adapted to at least partially support an electric machine component, and
   a seat portion having a substantially inverted "U" shape, said seat portion having a central surface and two opposing surfaces, said opposing surfaces having a first height and being separated by a first distance;
the conveyor apparatus comprising:
   at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off and said rail structure;
   at least one loop-shaped conveyor belt having an inner belt surface and an outer belt surface, said inner belt surface being at least partially disposed on said upper track of said rail structure and said outer belt surface being at least partially engaged by a pallet central surface;
   a drive for causing said conveyor belt to move on said upper track along said length;
   at least one mechanical stop having a surface for stopping said pallets along said length of said rail structure at a predetermined position; and
   said rail structure length is sufficient to allow the formation of a queue of said pallets on said rail structure behind said mechanical stop, wherein said first face of each pallet in said queue engages with the rear face of another pallet, except said first pallet of said queue, which engages with said mechanical stop surface.

7. A pallet and pallet conveyor apparatus comprising:
a plurality of pallets, each of said pallets comprising:
   a platform having an upper surface adapted to at least partially support an electric machine component, and
   a seat portion having a substantially inverted "U" shape, said seat portion having a central surface and two opposing surfaces, said opposing surfaces having a first height and being separated by a first distance;
the conveyor apparatus comprising:
   at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
   at least one loop-shaped conveyor belt having an inner belt surface and an outer belt surface, said inner belt surface being at least partially disposed on said upper track of said rail structure and said outer belt surface being at least partially engaged by a pallet central surface;
   a drive for causing said conveyor belt to move on said upper track along said length;
   at least one mechanical stop having a surface for stopping said pallets along said length of said rail structure at a predetermined position;
   said pallets are conveyed in a forward direction in a queue along said rail structure during operation, each of said pallets having a forward face pointing toward said forward direction and a rear face pointing opposite said forward direction, wherein said mechanical stop is positioned so that it makes contact with a forward face of a first of said pallets; and
   said forward and rear faces are sufficiently high to ensure sufficient engagement between adjacent pallets in said queue and to avoid an upstream pallet to climb over an adjacent downstream pallet.

8. A pallet and pallet conveyor apparatus comprising:
a plurality of pallets, each of said pallets comprising:
- a platform having an upper surface adapted to at least partially support an electric machine component, and
- a seat portion having a substantially inverted "U" shape, said seat portion having a central surface and two opposing surfaces, said opposing surfaces having a first height and being separated by a first distance;

the conveyor apparatus comprising:
- at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
- at least one loop-shaped conveyor belt having an inner belt surface and an outer belt surface, said inner belt surface being at least partially disposed on said upper track of said rail structure and said outer belt surface being at least partially engaged by a pallet central surface;
- a drive for causing said conveyor belt to move on said upper track along said length;
- said pallet conveyor apparatus configured such that each of said pallets can fit on said rail structure when said pallet is in at least a first orientation and a second orientation, said second orientation being 180° rotated from said first orientation, such that said orientation of said pallet is indicative of a condition of said component, and wherein each of said pallets further comprises a pin;
- a pin reader capable of detecting said pin when said pallet reaches a known point along said at least one rail structure and providing an output that is indicative of whether said pin has been detected at said point; and
- a control unit for determining pallet orientation based on said output, said control unit also being for determining further processing of said component based on said condition.

9. A pallet and pallet conveyor apparatus comprising:
a plurality of pallets, each of said pallets comprising:
- a platform having an upper surface adapted to at least partially support an electric machine component, and
- a seat portion having a substantially inverted "U" shape, said seat portion having a central surface and two opposing surfaces, said opposing surfaces having a first height and being separated by a first distance;

the conveyor apparatus comprising:
- a plurality of substantially horizontal rail structures that are substantially aligned in a vertical plane, each of said substantially horizontal rail structures having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
- a gripping unit having a set of at least two jaws for gripping at least one of said pallets and moving said at least one of said pallets from a first position to a second position on said substantially horizontal rail structures;
- at least one loop-shaped conveyor belt having an inner belt surface and an outer belt surface, said inner belt surface being at least partially disposed on said upper track of said rail structure and said outer belt surface being at least partially engaged by a pallet central surface; and
- a drive for causing said conveyor belt to move on said upper track along said length.

10. A pallet and pallet conveyor apparatus comprising:
a plurality of pallets, each of said pallets comprising:
- a platform having an upper surface adapted to at least partially support an electric machine component, and
- a seat portion having a substantially inverted "U" shape, said seat portion having a central surface and two opposing surfaces, said opposing surfaces having a first height and being separated by a first distance;

the conveyor apparatus comprising:
- a plurality of substantially horizontal rail structures that are substantially aligned in a vertical plane, each of said substantially horizontal rail structures having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
- a gripping unit having a set of at least two jaws for gripping at least one of said pallets and moving said at least one of said pallets from a first position to a second position on said substantially horizontal rail structures, wherein said first position and said second position are located on one of said rail structures, said gripping unit further comprising a substantially horizontal guide along which said set of jaws can move;
- at least one loop-shaped conveyor belt having an inner belt surface and an outer belt surface, said inner belt surface being at least partially disposed on said upper track of said rail structure and said outer belt surface being at least partially engaged by a pallet central surface; and
- a drive for causing said conveyor belt to move on said upper track along said length.

11. A pallet and pallet conveyor apparatus comprising:
a plurality of pallets, each of said pallets comprising:
- a platform having an upper surface adapted to at least partially support an electric machine component, and
- a seat portion having a substantially inverted "U" shape, said seat portion having a central surface and two opposing surfaces, said opposing surfaces having a first height and being separated by a first distance;

the conveyor apparatus comprising:
- a plurality of substantially horizontal rail structures that are substantially aligned in a vertical plane, each of said substantially horizontal rail structures having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
a gripping unit having a set of at least two jaws for gripping at least one of said pallets and moving said at least one of said pallets from a first position to a second position on said substantially horizontal rail structures wherein said first position is located on a first of said rail structures and a second position is located on a second of said rail structures, said gripping unit further comprising:
 a substantially horizontal guide along which said set of jaws can move; and
 a substantially vertical guide along which said set of jaws can move;
at least one loop-shaped conveyor belt having an inner belt surface and an outer belt surface, said inner belt surface being at least partially disposed on said upper track of said rail structure and said outer belt surface being at least partially engaged by a pallet central surface; and
a drive for causing said conveyor belt to move on said upper track along said length.

12. A pallet and pallet conveyor apparatus comprising:
a plurality of pallets, each of said pallets comprising:
 a platform having an upper surface adapted to at least partially support an electric machine component, and
 a seat portion having a substantially inverted "U" shape, said seat portion having a central surface and two opposing surfaces, said opposing surfaces having a first height and being separated by a first distance;
the conveyor apparatus comprising:
 at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off and said rail structure;
 at least one loop-shaped conveyor belt having an inner belt surface and an outer belt surface, said inner belt surface being at least partially disposed on said upper track of said rail structure and said outer belt surface being at least partially engaged by a pallet central surface;
 a drive for causing said conveyor belt to move on said upper track along said length;
 at least one mechanical stop having a surface for stopping said pallets along said length of said rail structure at a predetermined position; and
 said pallets are conveyed in a forward direction along said rail structure during operation, each of said pallets having a forward face pointing toward said forward direction and a rear face pointing opposite said forward direction, wherein said mechanical stop is positioned so that it makes contact with a forward face of a first of said pallets.

13. A pallet and pallet conveyor apparatus comprising:
a plurality of pallets, each of said pallets comprising:
 a platform having an upper surface adapted to at least partially support an electric machine component, and
 a seat portion having a substantially inverted "U" shape, said seat portion having a central surface and two opposing surfaces, said opposing surfaces having a first height and being separated by a first distance;
the conveyor apparatus comprising:
 a plurality of substantially horizontal rail structures that are substantially aligned in a horizontal plane, each of said substantially horizontal rail structures having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure, said plurality of rail structures comprising a first rail structure having a conveyor belt, a second rail structure having a conveyor belt, and a third rail structure having no conveyor belt, said third rail structure being alignable with said first rail structure and said second rail structure;
 at least one pallet pusher for moving pallets from said first rail structure to said second rail structure via said third rail structure;
 at least one loop-shaped conveyor belt having an inner belt surface and an outer belt surface, said inner belt surface being at least partially disposed on said upper track of said rail structure and said outer belt surface being at least partially engaged by a pallet central surface; and
 a drive for causing said conveyor belt to move on said upper track along said length.

14. A pallet and pallet conveyor apparatus comprising:
a plurality of pallets, each of said pallets comprising:
 a platform having an upper surface adapted to at least partially support an electric machine component, and
 a seat portion having a substantially inverted "U" shape, said seat portion having a central surface and two opposing surfaces, said opposing surfaces having a first height and being separated by a first distance;
the conveyor apparatus comprising:
 a plurality of substantially horizontal rail structures that are substantially aligned in a horizontal plane, each of said substantially horizontal rail structures having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure, said plurality of rail structures further comprising a first rail structure having a conveyor belt, a second rail structure having a conveyor belt, and a third rail structure having no conveyor belt, said third rail structure being alignable with said first rail structure and said second rail structure, and wherein said apparatus further comprises:
 at least one pallet pusher for moving pallets from said first rail structure to said second rail structure via said third rail structure, said at least one pallet pusher comprising:
  a first pallet pusher for moving pallets from said first rail structure to said third rail structure when said third rail structure is aligned with said first rail structure; and
  a second pallet pusher for moving pallets from said third rail structure to said second rail structure when said third rail structure is aligned with said second rail structure;

at least one loop-shaped conveyor belt having an inner belt surface and an outer belt surface, said inner belt surface being at least partially disposed on said upper track of said rail structure and said outer belt surface being at least partially engaged by a pallet central surface; and a drive for causing said conveyor belt to move on said upper track along said length.

15. A pallet and pallet conveyor apparatus comprising:

a plurality of pallets, each of said pallets comprising:
  a platform having an upper surface adapted to at least partially support an electric machine component, and
  a seat portion having a substantially inverted "U" shape, said seat portion having a central surface and two opposing surfaces, said opposing surfaces having a first height and being separated by a first distance;

the conveyor apparatus comprising:
  at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
  at least one loop-shaped conveyor belt having an inner belt surface and an outer belt surface, said inner belt surface being at least partially disposed on said upper track of said rail structure and said outer belt surface being at least partially engaged by a pallet central surface;
  a drive for causing said conveyor belt to move on said upper track along said length;
  at least one bore; and
  at least one lifting rod that can at least partially fit in said bore, said rod being for moving any of said pallets from a first position to a second position.

16. A pallet and pallet conveyor apparatus comprising:

a plurality of pallets, each of said pallets comprising:
  a platform having an upper surface adapted to at least partially support an electric machine component, and
  a seat portion having a substantially inverted "U" shape, said seat portion having a central surface and two opposing surfaces, said opposing surfaces having a first height and being separated by a first distance;

the conveyor appratus comprising:
  at least one substantially horizontal rail structure having a length, an upper track, and two side surfaces, said side surfaces having a second height and being separated by a second distance, wherein said first distance is larger than said second distance so that said rail structure can fit between said opposing surfaces, and wherein said first and second heights are sufficient to prevent a pallet from falling off said rail structure;
  at least one loop-shaped conveyor belt having an inner belt surface and an outer belt surface, said inner belt surface being at least partially disposed on said upper track of said rail structure and said outer belt surface being at least partially engaged by a pallet central surface;
  a drive for causing said conveyor belt to move on said upper track along said length;
  at least one bore;
  at least one lifting rod that can at least partially fit in said bore, said rod being for moving any of said pallets from a first position to a second position; and
  at least one processing station wherein said first position is on said rail structure and said second position is at said at least one processing station.

17. A pallet and pallet conveyor apparatus comprising:
  at least one substantially horizontal rail structure having a length, an upper track, and a height;
  at least one loop-shaped conveyor belt for each rail structure, each belt having an inner belt surface and an outer belt surface, each of said inner belt surfaces being at least partially disposed on said upper track of said respective rail structure;
  at least one drive cartridge for each rail structure, each cartridge being located substantially within each of said horizontal rail structures for causing a respective conveyor belt to move on said respective upper track along said rail length; and
  a plurality of pallets, each of said pallets comprising a platform having an upper surface adapted to at least partially support an electric machine component, and a seat portion having a substantially inverted "U" shape adapted to receive and be supported by said horizontal rail structures so as to substantially prevent relative movement along direction x between a pallet and said rail structure, and wherein said outer belt surface is at least partially engaging said seat portion.

18. The pallet conveyor apparatus of claim 17 wherein each of said rail structures have complementary end shapes to minimize any gap formed when placed in horizontal end-to-end alignment, thereby allowing direct pallet transfer between adjacent horizontal rail structures.

19. The pallet conveyor apparatus of claim 17 wherein said drive cartridge comprises:
  a motor wheel that drives said conveyor belt; and
  a tension wheel that provides tension in said belt.

20. For use in a manufacturing line, a method of transferring a pallet being conveyed by a first substantially horizontal rail structure to a second substantially horizontal rail structure, wherein said pallet is for carrying at least one electric machine component, and wherein said pallet comprises a platform having an upper surface adapted to at least partially support the component and a seat portion having a substantially inverted "U" shape with a central surface, said method comprising:
  conveying said pallet along said first rail structure with a conveyor belt that engages said central surface;
  stopping said pallet at a point on said first rail structure with a physical stop;
  engaging said pallet with transfer equipment;
  transferring said pallet with said transfer equipment from said first rail structure to said second rail structure; and
  disengaging said pallet with said transfer equipment so that said at least one electric machine component is available for further processing.

21. The method of claim 20 wherein said first and second horizontal rail structures are substantially vertically aligned, and wherein said transferring comprises:
  lifting said pallet from said first rail structure;
  moving said pallet to a position above said second rail structure; and
  lowering said pallet onto said second rail structure.

22. The method of claim 20 wherein said transferring comprises transferring said pallet from said first rail structure to said second rail structure with said transfer equipment without using said central surface of said seat portion.

23. The method of claim 20 wherein said pallet includes at least one gib on the outside of said pallet, said method further comprising:

pushing said pallet so that said gib is pressed against a surface having a precisely known position; and
unloading said component from said pallet.

* * * * *